United States Patent [19]

Maki et al.

[11] Patent Number: 4,758,117
[45] Date of Patent: Jul. 19, 1988

[54] METHOD FOR THE TRANSPORTATION OF A PARTICULATE MATERIAL AT CONTROLLED RATE

[75] Inventors: Yunosuke Maki; Youichi Watanabe; Yasuhiko Sakaguchi; Kazuaki Tanaka, all of Chiba; Yuichi Kobayashi, Tokyo; Hideo Ooishi, Tokyo; Minoru Kobayashi, Tokyo, all of Japan

[73] Assignees: Kawasaki Steel Corp.; Denka Consultant & Engineering Co., Ltd., both of Tokyo, Japan

[21] Appl. No.: 788,393

[22] Filed: Oct. 17, 1985

[30] Foreign Application Priority Data

Dec. 28, 1984 [JP] Japan ................ 59-274393

[51] Int. Cl.$^4$ .............................................. B65G 53/66
[52] U.S. Cl. ......................................... 406/14; 406/12; 406/24; 406/93; 406/123
[58] Field of Search .............. 406/12, 14, 24, 25, 406/93–95, 123, 124

[56] References Cited

U.S. PATENT DOCUMENTS

| | | | |
|---|---|---|---|
| 4,368,678 | 1/1983 | Ulveling | 406/14 X |
| 4,482,275 | 11/1984 | Shinozaki et al. | 406/24 X |
| 4,483,646 | 11/1984 | Moriyama | 406/123 X |
| 4,529,336 | 7/1985 | Shinozaki et al. | 406/123 X |

FOREIGN PATENT DOCUMENTS

| | | | |
|---|---|---|---|
| 107316 | 7/1982 | Japan | 406/14 |
| 36028 | 2/1984 | Japan | 406/14 |

Primary Examiner—Galen Barefoot
Assistant Examiner—Paul E. Salmon
Attorney, Agent, or Firm—Bierman and Muserlian

[57] ABSTRACT

The invention provides an efficient method for controlling the flow rate of a particulate material through a pneumatic transportation pipe at a preset value with a high accuracy and rapid response to an external disturbance added to the system by controlling the flow rate of the booster gas. Different from conventional methods in which the flow rate of the booster gas is controlled with the feedforward factor of the variation in the actual flow rate of the particulate material, the inventive method utilizes the variation in the pressure in the receiving unit as the feedback to control the flow rate of the booster gas so that the above mentioned advantages are obtained in the accuracy of control and rapidness of the response to an external disturbance.

3 Claims, 5 Drawing Sheets

METHOD FOR THE TRANSPORTATION OF A PARTICULATE MATERIAL AT CONTROLLED RATE

BACKGROUND OF THE INVENTION

The present invention relates to a method for the pneumatic transportation of a particulate material at controlled rate or, more particularly, to a method for the pneumatic transportation of a particulate material in which, when an external disturbance is added to the transportation system, the external disturbance is rapidly absorbed to maintain the acting capacity of the transportation system at a preset level or, when the preset level of the transportation rate is changed, the desired new transportation rate can rapidly be established with self-correctability of the transportation capacity in compliance with the changes in the properties of the particulate material under transportation.

In a conventional pneumatic transportation system of a particulate material, as is illustrated in FIG. 5 of the accompanying drawing, presetting of the desired transportation rate Ws is followed by the setting of the flow rate Qb of the booster gas and the pressure Pt in the pressure tank determined by the preliminary calibration running before the actual operation of the system. The actual transportation rate WA of the particulate material under transportation is measured as a differential value of the output signal from the weighing instrument of the pressure tank and/or by means of a flow meter for a particulate material installed on the way of the transportation piping. The flow rate Qb of the booster gas is controlled by means of a flow rate controller installed on the way of the supply line of the booster gas in accordance with the deviation of the actual transpotation rate WA from the preset value Ws of the desired transportation rate so as to maintain the transportation rate W of the particulate material at the preset level Ws.

When the transportation system under the above described control means receives certain external disturbance such as fluctuation of the pressure Pb in the receiving unit or the pressure Pt in the pressure tank and presence of a foreign body in the transportation piping, a considerable length of time lag is unavoidable before the conversion of the actual transportation rate WA of the particulate material to the preset value Ws of the desired transportation rate even by providing each of the detectors and controllers with the highest sensitivity because the controlling movement of the controller is started only after the detection of the increment or decrement in the actual transportation rate WA of the particulate material under transportation. A similar problem is also encountered when the properties of the particulate material are under variation from lot to lot or when the preset value Ws of the desired transportation rate is changed.

SUMMARY OF THE INVENTION

An object of the present invention is therefore, in view of the above described problems and disadvantages in the conventional transportation system of a particulate material, to provide a novel method for controlling the rate of pneumatic transportation of a particulate material with high stability and accuracy to rapidly respond to any external disturbance added to the system.

Thus, the method of the invention for controlling the rate of pneumatic transportation of a particulate material comprises, in the pneumatic transportation of a particulate material in a transportation apparatus equipped with a detector means for detecting the transportation rate of a particulate material in which a piping for the booster gas is connected to at least one pneumatic piping for transportation having an end opening at the fluidizing bed in a pressure tank filled with the particulate material and the other end opening at a receiving unit, calculating the target flow rate of the booster gas through the pneumatic piping from the pressure drop in the pneumatic piping expressed by the difference between the pressure in the pressure tank, i.e. the pressurizing pressure, and the pressure in the receiving unit, i.e. the receiving pressure, and the target value of the desired transportation rate and controlling the flow rate of the booster gas on the base of the thus calculated value.

DETAILED DESCRIPTION OF THE PREFERRED EMBODIMENTS

Figure 1:
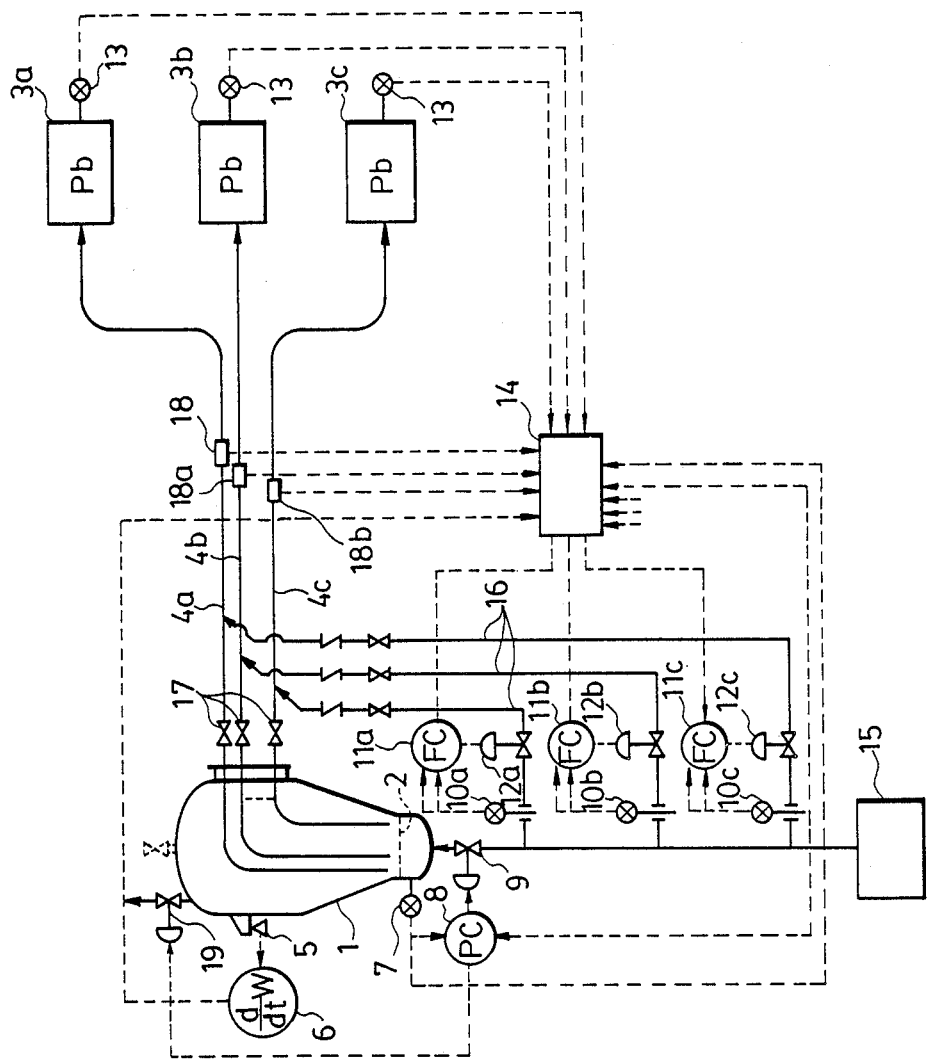
FIG. 1 is a system diagram of the apparatus used in practicing the method of the invention.

The method of the present invention is applicable to an apparatus for pneumatic transportation of a particulate material at a controlled rate in which the particulate material fluidized in a pressure tank is transferred through one or more of pneumatic pipes into one or respective receiving units. A booster gas is supplied to the pneumatic pipes and the apparatus is equipped with a weight detector or a combination of a weight detector and mass flow meter to detect the flow rate of the particulate material.

The present invention provides a method for controlling the flow rate of a particulate material under pneumatic transportation at a controlled rate comprising, taking the flow rate of the booster gas supplied to the pneumatic pipe as Qb, the pressure in the pressure tank as Pt, the pressure in the receiving unit as Pb and the preset value of the desired transportation rate of the particulate material from the pressure tank to the receiving unit as W, calculating the flow rate of the booster gas corresponding to $Pt-Pb-Pw$ or, that is, the difference between the pressure drop in the pneumatic pipe given by $Pt-Pb$ and the pressure drop $\Delta Pw$ when the flow rate of the particulate material is W and controlling the flow rate of the booster gas on the basis of the thus calculated value so as to maintain the actual transportation rate of the particulate material at the desired preset value.

The invention also provides a method for controlling the flow rate of a particulate material under pneumatic transportation at a controlled rate in which the actual flow rate of the particulate material is maintained at the desired preset value by concurrently controlling the pressure Pt ($kg/cm^2$) in the pressure tank and the flow rate of the booster gas Qb(m³/min) on the basis of the above mentioned result of the calculation in the case where the minimum flow rate in the pneumatic pipe V (m/sec) calculated by the equation $$V = Qb \times 1/A \times 1/60 \times 1.033/(1.033 + Pt), \quad (1)$$

in which A(m²) is the cross sectional area of the pneumatic pipe, is smaller than the critical flow rate $V_{lim}$ inherent to the particulate material under transportation or where the calculated flow rate Qb of the booster gas is larger than the upper limit $Qb_{max}$ of the booster gas restricted by the capacity of the utility source.

Further, the invention provides a method for controlling the flow rate of a particulate material under pneumatic transportation at a controlled rate in which, when the actual flow rate of the particulate material WA deviates from the desired preset value of the flow rate Ws by a difference ΔW for one or more reasons such as the variation in the properties of the particulate material from the calibration running to actual load running, the operation of the calculation is performed by relacing the desired preset value of the flow rate with W−ΔW so that correction is made for the deviation ΔW.

Two alternative equations (2) and (2') below are available for the actual calculation of the flow rate Qb(Nm³/min) of the booster gas from the pressure drop in the pneumatic pipe:

$$Qb = -K_2W + \sqrt{(K_2W)^2 + (1/K_1)(Pt-Pb)(2+Pt+Pb)} \quad (2)$$

and $$Qb = \sqrt{K_1(2+Pt+Pb)(Pt-Pb-K_2W)} \quad (2')$$

in which $K_1$ and $k_2$ are each a constant determined by the physical properties of the particulate material and the dimensional parameters of the pneumatic pipe;

The equation (2) is applicable to the range where the solid-gas ratio KG.S/KG.G is relatively small while the equation (2') is applicable where the ratio is relatively large although no definite demarcation can be given between the applicable ranges of these two equations. In the following, explanations are given with reference to the equation (2).

FIG. 1 illustrates the system diagram of a typical example of the apparatus for practicing the method of the present invention. In the apparatus, the pressure tank 1 is provided with a fluidizing bed 2 and a weighing instrument 5 and the particulate material in the pressure tank 1 is transferred pneumatically by the booster gas supplied from the booster gas feed line 16 connected to the transfer valve 17 in the vicinity of the secondary side thereof through the pneumatic pipes 4a, 4b, 4c each opening at one end on the fluidizing bed 2 and opening at the other end in the respective receiving unit 3a, 3b or 3c.

The pressure Pt in the pressure tank 1 is detected in the pressure detector 7 where it is converted into an electric signal and inputted to the pressure regulator 8 and the operation controller 14. The control signal from the operation controller 14 in turn serves to control the pressure at a constant level by operating the pressure regulator valve 9 or the discharge pressure regulator valve 19.

The pressure in the receiving units 3a, 3b and 3c is detected in the pressure detector 13 and the signal thereof is inputted to the operation controller 14.

The flow rate of the booster gas Qb is detected in the flow rate detectors 10a, 10b, 10c and converted into electric signals to be taken into the flow rate regulators 11a, 11b, 11c and the operation controller 14 so that the flow rate is regulated by means of the flow rate regulator valves 12a, 12b, 12c operated by the control signals from the operation controller 14.

The transportation rate of the particulate material is inputted to the operation controller 14 in the form of a value obtained by processing the output signal from the weighing instrument 5 of the pressure tank 1 in the differential calculator 6 and / or an output signal from the flow rate meters for particulate material 18a, 18b, 18c installed on the way of the pneumatic pipes.

Figure 2:
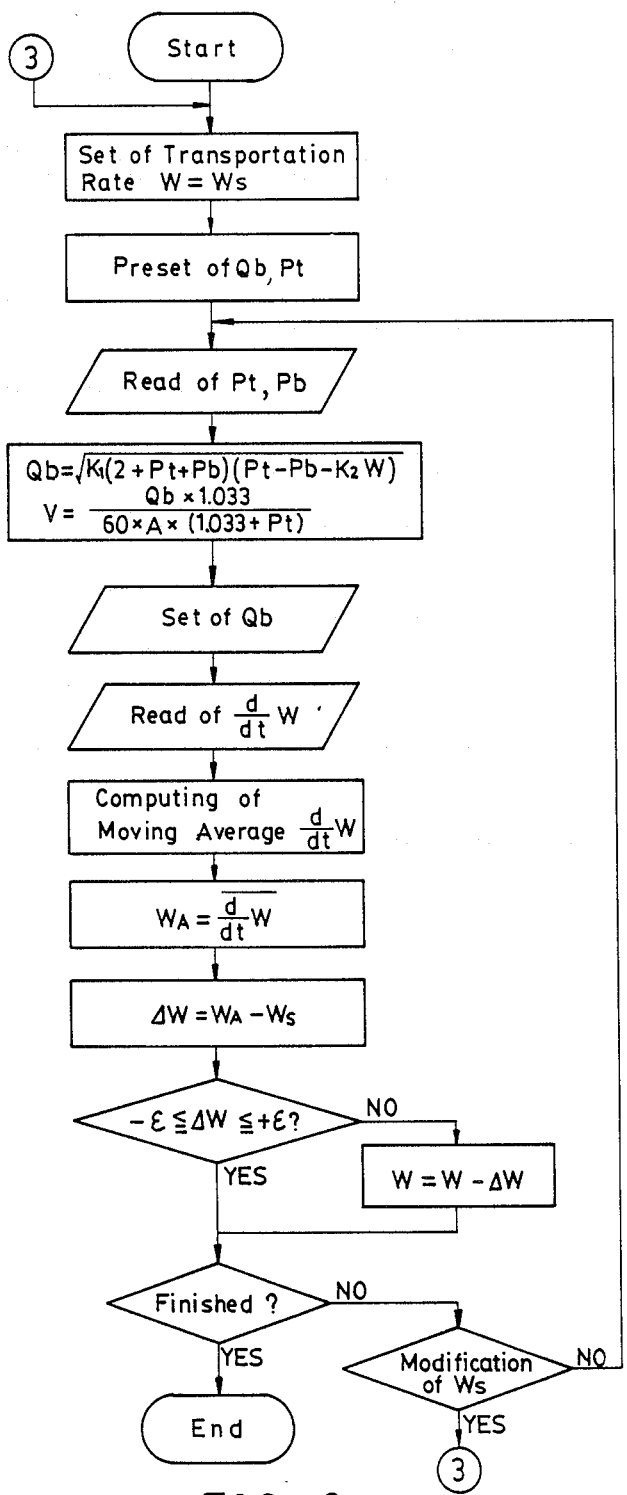
FIG. 2 is a modified flow chart illustrating the controlling method of transportation according to the invention.

In the following, the operation of the above described apparatus is explained with reference to FIG. 2 showing a flow chart for the transfer route from the pressure tank 1 to the receiving unit 3 through the pneumatic pipe 4.

The operation of the apparatus is started by setting the flow rate Qb of the booster gas and the pressure Pt in the pressure tank 1 determined in a preliminary calibration running in accordance with the desired preset value of the transportation rate Ws of the particulate material.

The signals of the pressure Pt in the pressure tank 1 and the pressure Pb in the receiving unit 3 are inputted to the operation controller 14 after every cycle of scanning where the flow rate Qb of the booster gas is calculated using the equation (2) given above and the results of the calculation are converted to control signals which serve to modify the target value of the flow rate regulator 11 so as to constantly give correction to the flow rate Qb of the booster gas. In the same time, the operation controller 14 calculates the minimum flow rate V in the pneumatic pipe using the equation (1) given above.

The signal of the actual flow rate WA of the particulate material under transportation is unintermittently inputted to the operation controller 14 in the form of a value obtained by processing the output signal from the weighing instrument 5 of the pressure tank 1 in the differential calculator 6 and / or the output signal from the flow rate mater 18 for particulate material installed on the way of the pneumatic pipe to be compared with the preset value Ws of the desired transportation rate and give the deviation ΔW therefrom.

An explanation is given on the influence of an external disturbance taking the increase in the pressure Pb in the receiving unit 3 as an example. In the constant-level control of the flow rate of the booster gas in a usual manner, the actual flow rate WA of the particulate material under transportation is decreased by a decrement corresponding to the increase in the pressure Pb in the receiving unit 3. In the conventional method for control in which the flow rate WA of the particulate material under transportation is maintained at a constant level by decreasing the target value of the flow rate regulator 11 of the booster gas after detection of the decrease in the flow rate WA of the particulate material, a time lag is always unavoidable before conversion of the flow rate WA of the particulate material to the preset value of the desired transportation rate Ws.

In the controlling method of the present invention, on the other hand, the output signal from the internal pressure detector 13 of the receiving unit 3 is unintermittently inputted to the operation controller 14 where the flow rate Qb of the booster gas is calculated using the equation (2) to give a result used for the control thereof so that the target value in the flow rate regulator 11 of the booster gas can be decreased in real-time in the moment when the internal pressure Pb in the receiving unit 3 begins to increase almost without a time lag to maintain the actual flow rate WA of the particulate material under transportation at a constant level.

Figure 3:
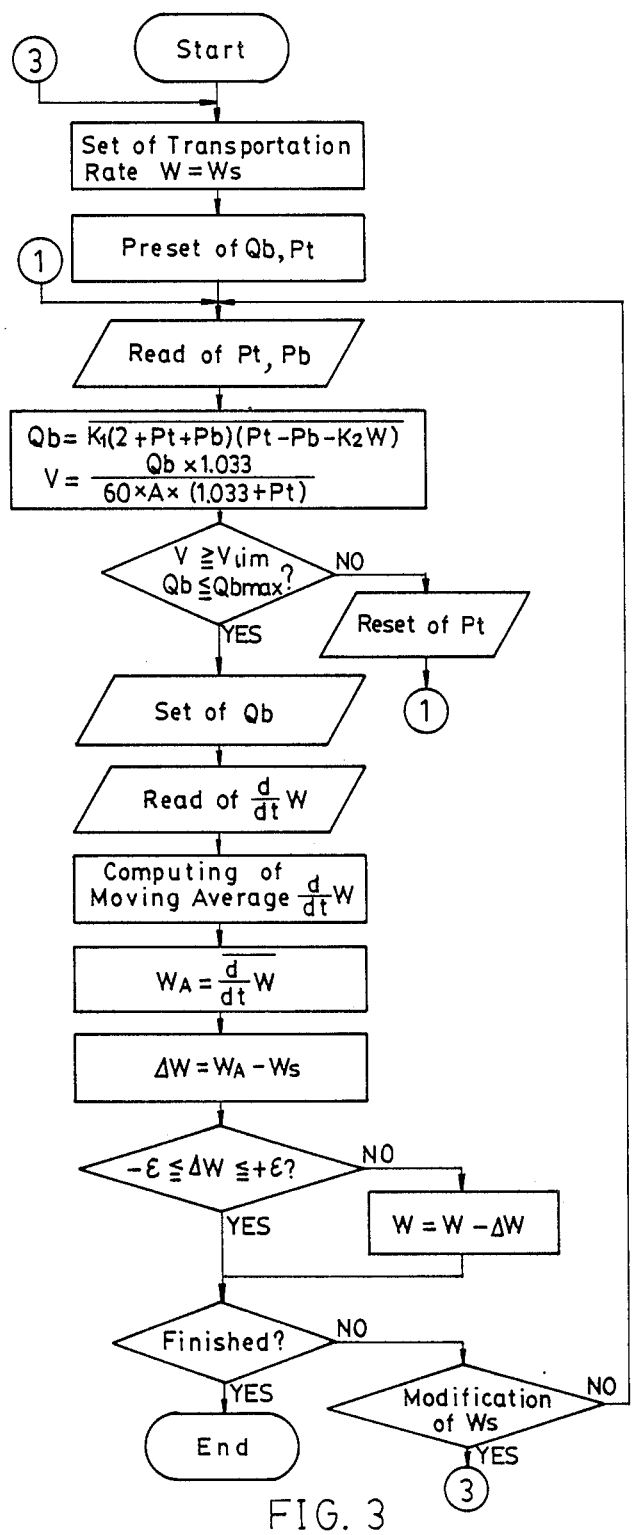
FIG. 3 is a flow chart illustrating the controlling method of transportation according to the invention.

FIG. 3 illustrates a revised flow chart derived from FIG. 2, involving a check step of the pressure in the pressure tank Pt.

Along with the above mentioned calculation of the flow rate Qb of the booster gas, the operation controller 14 calculates the minimum flow rate V in the pneumatic pipe using the equation (1) and, when the minimum flow rate V in the pneumatic pipe is smaller than the critical flow rate of transportation $V_{lim}$ inherent to the particular particulate material under transportation, the operation controller 14 outputs a control signal to gradually increase the target value of the pressure regulator 8 so that the pressure in the pressure tank Pt is gradually increased. Needless to say, in this case, the flow rate Qb of the booster gas is also calculated in the operation controller 14 using the equation (2) and controlled.

The above described effect is not limited to the case of the increased internal pressure Pb in the receiving unit 3 but similar effects can be obtained, needless to say, also in the cases of a decreased internal pressure Pb in the receiving unit 3, varied internal pressure Pt in the pressure tank 1, variation in the actual flow rate WA of the particulate material due to a forign body in the pneumatic pipe eventually entering it and changed preset value of the transportation rate Ws.

Figure 4:
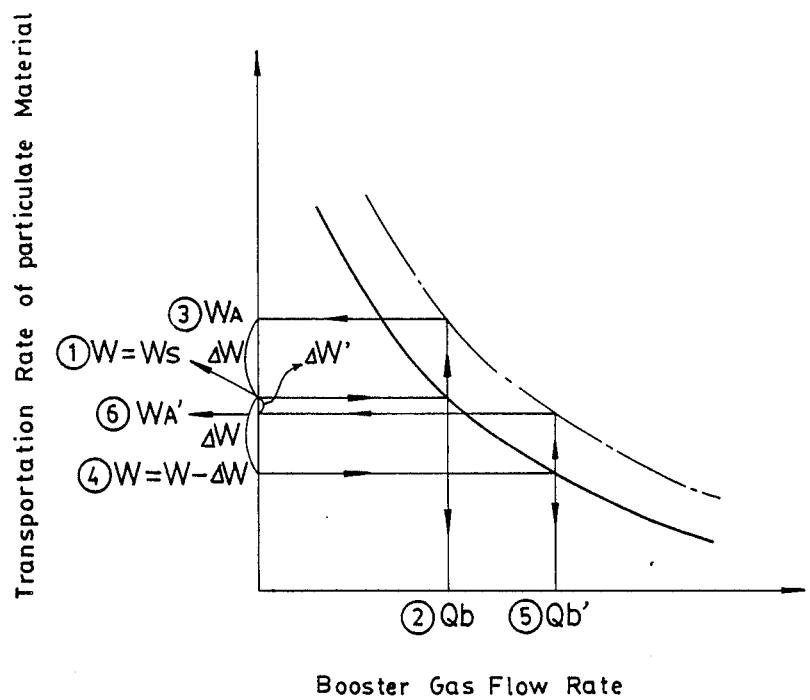
FIG. 4 is a graph showing the relationship between the flow rate of the booster gas and the transportation rate.
Figure 5:
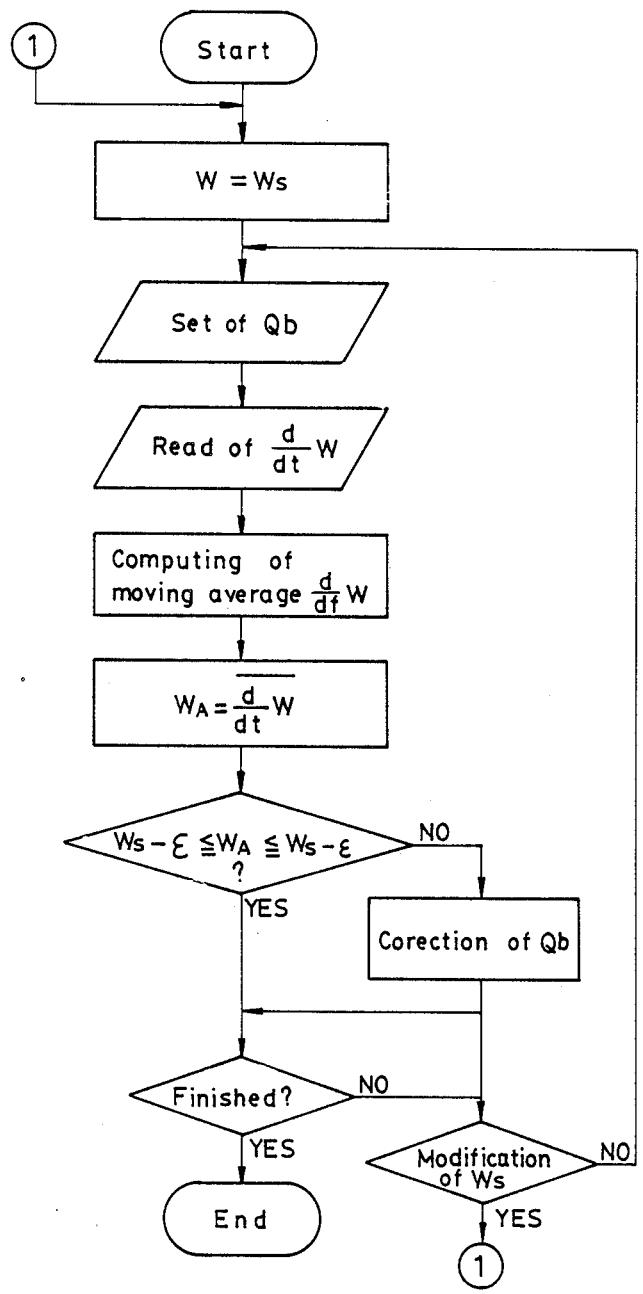
FIG. 5 is a flow chart illustrating the conventional controlling method of transportation rate.

In an actual transportation system of a particulate material, it is not rare that the physical properties of the particulate material are subject to variation from lot to lot as received. Whereas a change in a physical property of the particulate material may result in the loss of the appropriateness of the constants $K_1$ and $K_2$ in the equation (2) originally determined by the preliminary calibration running, the controlling method of the present invention is practiced to replace the target value W for the transportation rate of the particulate material in the operation controller 14, without modifying the values of the constants $K_1$ and $K_2$, with $(W-\Delta W)$ in accordance with the deviation $\Delta W$ of the actual flow rate WA of the particulate material under transportation from the preset value Ws of the desired transportation rate so that the deviation $\Delta W$ is self-corrected. To give an explanation of this effect with reference to FIG. 4, the corrected flow rate Qb' of the booster gas is determined from the target value W of the transportation rate and the calibration curve for the transportation rate in the steps of setting of the transportation rate at Ws, determination of the flow rate Qb of the booster gas from the calibration curve, determination of the transportation rate WA of the particulate material in the transportation system corresponding to the value of Qb and replacement of the target value W of the transportation rate with $(W-\Delta W)$ in which $\Delta W$ is the deviation of the actual flow rate WA of the particulate material from the target value W. The deviation $\Delta W$ can be compensated almost completely by repeating the above described process subsequent to the determination of the value of WA.

As is described above, the controlling method of the present invention is useful in the pneumatic transportation of a particulate material at a controlled rate with a highly accurate stability of the rate and rapid response to any external disturbance added to the transportation system and to any change in the preset value of the desired transportation rate. In addition, the inventive method provides a means of self-correction for the variation of the physical properties of the particulate material in the pneumatic transportation of the particulate material at a controlled rate. The method of the present invention is particularly effective when the above mentioned receiving unit 3 is a blast furnace, an open-hearth furnace or a boiler into which a particulate fuel is blown as being carried by a gas although the type of the receiving unit 3 is not particularly limitative including any conventinal vessels used under normal pressure.

What is claimed is:

1. A method for controlling the rate of pneumatic transportation of a particulate material in a transportation aparatus equipped with a detector means for detecting the transportation rate of the particulate material in which a pipe for the booster gas is connected to at least one pneumatic pipe for transportation having an end opening at the fluidizing bed in a pressure tank filled with the particulate material and the other end opening at a receiving unit which comprises:

calculating the target value of the flow rate of the booster gas through the pneumatic transportation pipe from the pressure difference between the pressure in the pressure tank and the pressure in the receiving unit and the pressure drop corresponding to the target value of the desired transportation rate of the particulate material; and controlling the flow rate of the booster gas in accordance with the thus calculated value.

2. The method as claimed in claim 1 which further comprises detecting a deviation $\Delta W$ of an actual transportation rate of the particulate material WA from a preset value of the desired transportation rate Ws and performing the calculation by replacing the target value of the transportation rate W with $(W-\Delta W)$ so as to correct the deviation $\Delta W$.

3. The method as claimed in claim 1 wherein the flow rate of the booster gas is controlled in accordance with an output calculated by use of an equation $$Qb = -K_2W + \sqrt{(K_2W)^2 + (1/K_1)(Pt-Pb)(2+Pt+Pb)}$$

or $$Qb = \sqrt{K_1(2+Pt+Pb)(Pt-Pb-K_2W)}$$

in which Qb is the calculated flow rate of the booster gas in $Nm^3$/hour, Pt is the pressure in the pressure tank in $kg/cm^2$, Pb is the pressure in the receiving unit in $kg/cm^2$, W is the target value of the transportation rate in kg/min and $K_1$ and $K_2$ are each a constant determined by the kind of the particulate material under transportation and the dimensional parameters of the pneumatic transportation pipe.

* * * * *

UNITED STATES PATENT AND TRADEMARK OFFICE
CERTIFICATE OF CORRECTION

PATENT NO. : 4,758,117
DATED : July 19, 1988
INVENTOR(S) : Yunosuke Maki; Yourichi Watanabe; Yasuhiko Sakaguchi; Kazuaki Tanaka; Yuichi Kobayashi; Hideo Ooishi; Minoru Kobayashi It is certified that error appears in the above-identified patent and that said Letters Patent is hereby corrected as shown below:

| Col. | Line | |
|---|---|---|
| 3 | 30 | "$\sqrt{(K_2W)^2+(1/K_1)(Pt-Pb)(2+Pt+Pb)}$" should be --$\sqrt{(K_2W)^2+(1/K_1)(Pt-Pb)(2+Pt+Pb)}$-- |
| 6 | claim 3, Line 50 | " " " " " " " " " " " " " " |

Signed and Sealed this

Third Day of January, 1989

Attest:

DONALD J. QUIGG

Attesting Officer   Commissioner of Patents and Trademarks